Patented Mar. 13, 1945

2,371,560

UNITED STATES PATENT OFFICE 2,371,560

METHOD OF CONCENTRATING LATEX

Godfried Johan van der Bie, Buitenzorg, Java, Netherland East Indies; vested in the Alien Property Custodian No Drawing. Application August 12, 1941, Serial No. 406,557. In the Netherlands May 7, 1940

1 Claim. (Cl. 260—822)

This invention relates to method of concentrating latex; and it comprises a process in which there is added to a latex to be concentrated a stabilizing or peptizing agent, usually in small quantity but sufficient to produce a stability of not substantially less than about 15 minutes, as determined by the Hamilton Beach stirrer test, without substantially increasing the viscosity of the latex, and the latex is then passed through a centrifuge adjusted to produce a concentrated cream having a rubber content of over 60 per cent by weight; all as more fully hereinafter set forth and as claimed.

It has long been known that aqueous rubber dispersions especially rubber latex, can be separated into two layers of differing rubber content by means of centrifugal action. The upper layer obtained is richer and the lower layer is poorer in rubber constituents than the starting dispersions. But according to this method it is only possible to obtain a cream with a rubber content of about 60 percent. The same can be said of creams obtained by creaming with the aid of a mucilaginous substance.

C. F. Flint comments on these limitations in processes of concentrating latex in his book entitled "Chemistry and Technology of Rubber Latex" (1938). On page 200 he states, for example: "In a latex of 60 per cent rubber content the particles are already so closely packed that their freedom of movement in the serum is restricted by their proximity one to another. The viscosity of a 60 per cent latex limits to a cream of this rubber content the separation that can be achieved by centrifuges of practicable speed."

Further on, page 209, he states: "It will be noted that in creaming as in centrifuging a rubber content of 60 per cent is approximately the upper limit of concentration."

The present invention relates to a process for the concentration of aqueous rubber dispersions by centrifugal action, wherein a substance is added to the dispersion before concentration, which substance increases the mechanical stability of the aqueous rubber dispersion. The increase of the mechanical stability in this manner makes it possible to obtain a cream with a rubber content of more than 65 per cent in a normal centrifugal machine without any difficulties arising. This is a new result in the rubber art.

Care must be taken that the added substances, which increase the mechanical stability, do not bring about any considerable increase of viscosity of the rubber dispersion. The materials which are operative are those which are usually classified as peptizing or emulsifying agents, and which tend to reduce the viscosity while increasing the stability, apparently due to an increase in the degree of dispersion of the rubber particles. These substances are to be contrasted with the so-called protective colloids which increase stability primarily through an increase in viscosity. Alkali metal soaps, for example, are particularly effective, while protective colloids such as haemoglobin and mucilaginous substances, are ineffective. It is also necessary that the substance added be capable of producing a certain minimum increase in mechanical stability.

It has been found that there is a critical stability value above which it is possible to obtain increased rubber concentrations in the centrifuging process and below which the improvement obtained is not appreciable. This stability value is of the order of 15 minutes, as determined by the standard method in which a Hamilton Beach stirrer operating at a rate of 10,000 revolutions per minute is employed. If this stirrer can be operated in the latex for a period of 15 minutes or over without the formation of irreversible flocculated particles, the latex has the required stability. All peptizing, dispersing or stabilizing agents which are compatible with latex and which are capable of producing this stability, without appreciably increasing the viscosity of the latex, are suitable for use in the present process. The number of agents which are capable of producing this desired stability are rather few.

The addition of various stabilizers to latex is, of course, very old. But it has apparently never been discovered heretofore that the addition of certain of these stabilizers, in quantity sufficient to produce a stability above a certain critical value, enables the production of creams having rubber concentrations of over 60 per cent merely by passing the treated latex through a properly adjusted centrifuge.

The present invention also includes the discovery that the treated latex can be passed through a centrifuge without stoppage for a time which is at least twice as long as that in the case of an untreated latex. This feature, of course, greatly extends the capacity of the centrifuging plant. A further incidental advantage of the new process is that the creams produced are more stable than those produced by centrifuging untreated latex owing to the fact that part of the stabilizing agent remains in the cream after the centrifugal action.

A large number of stabilizing agents have been examined, using the Hamilton Beach stirrer test, in order to determine their effectiveness. Part of the results obtained are collected in the following table:

| Addition per liter latex | Mechanical stability |
| --- | --- |
| No addition (latex with a content of 32% of rubber and 0.3% of ammonia) | 2′ to 2′30′′ |
| 3 g. ammonia | 2′ to 2′30′′ |
| 50 ml. NaOH 5% | 4′ to 4′30′′ |
| 50 ml. soda 5% | 2′30′′ to 3′ |
| 50 ml. borax 5% | 2′30′′ to 3′ |
| 25 ml. borax-casein 10% | 3′ to 3′30′′ |
| 50 ml. borax-casein 10% | 9′ to 10′ |
| 50 ml. Vultamol 5% | 2′ to 2′30′′ |
| 50 ml. Nekal BX (an alkyl naphthalene sulfonate) 5% | 9′ to 10′ |
| 25 ml. Igepon (acid sulfuric ester of octodecyl-lactate) 5% | 3′30′′ to 4′ |
| 50 ml. Igepon (acid sulfuric ester of octodecyl-lactate) 5% | 6′ to 7′ |
| 50 ml. Turkey red oil 5% | 3′30′′ to 4′ |
| 50 ml. Vulcastab N 5% | 7′ to 8′ |
| 25 ml. sodium soap solution 5% | 12′ to 13′ |
| 50 ml. sodium soap solution 5% | 30′ |
| 10 ml. borax-casein 10%+15 ml. Igepon 5% | 6′ to 7′ |
| 10 ml. borax-casein 10%+25 ml. soap 5% | 24′ |
| 10 ml. Igepon 5%+25 ml. soap 5% | 24′ |

As stated above only those stabilizers are suitable which are capable of bringing the mechanical stability of rubber dispersions to at least 15′. Of the various agents listed in the table, 50 ml. 5% sodium soap solution, 25 ml. of 5% soap solution mixed with 10 ml. of 10% borax-casein, and 25 ml. of soap solution mixed with 10 ml. of 5% Igepon are thus seen to be suitable. The addition agent may be added immediately before or during the centrifugal action.

The invention can be explained with somewhat greater particularity by reference to the following specific examples which represent illustrative as well as practical embodiments of the improved process.

Example 1

The latex employed in this example contained 32.1% of rubber and 0.25% ammonia. It was purified before treatment by settling for 20 hours. The test was made two days after tapping. The centrifuge employed was one of the usual De Laval type, bowl type L770, operating at about 7000 revolutions per minute.

Part of the latex was concentrated without the addition of a stabilizer and the bowl was found to be obstructed after 110 minutes. The rubber content of the cream was found to be 61 to 62% and of the serum (the under latex) 8 to 9.5%. The average capacity was 210 kg. latex (32.1%) per hour.

To another part of the same latex 50 ml. stabilizing solution per liter were added. This stabilizing solution consisted of 5 per cent solution of sodium soap and Igepon in a proportion of 5 to 2. This treated latex was then centrifuged with the same adjustment of the centrifugal machine operating at the same number of revolutions per minute. The operation was stopped after 5½ hours at which time no obstruction of the bowl had occurred. When the bowl was opened its condition appeared to be such that it would have been possible to have continued the operation for several hours longer.

The rubber content of the cream was found to be 63 to 64 per cent and of the under latex 8 to 9 per cent. The average capacity was 190 kg. latex (32.1%) per hour.

For the mechanical stability the following values were found:

| | Without stabilizer | With stabilizer |
| --- | --- | --- |
| | Minutes | Minutes |
| Starting latex | 3 | 60 |
| Cream | 1 to 3 | 7 to 8 |

This example shows that, by the addition of a stabilizer improving the mechanical stability, a more concentrated cream can be obtained with a greater mechanical stability, using the same adjustment of the centrifuge, and that the centrifugal can be used for a longer time without obstruction occurring.

Example 2

The latex employed in this example contained 32.6% rubber and 0.35% of ammonia. The greater part of the heavy impurities was removed by settling for 40 hours.

The test was conducted on the second day after tapping with the aid of the same centrifuge as that used in Example 1, operating at the same speed. But the adjustment of the centrifuge was changed to produce a more concentrated cream.

With the new adjustment of the centrifuge, it was attempted to concentrate the untreated latex but it was found that stoppage of the bowl occurred almost at once so that no practical results could be obtained. Another sample of latex was then centrifuged which had been stabilized by the addition of the same stabilizer and in the same quantity as that used in Example 1. In this test a cream was obtained having a rubber content of 64.8 to 65.8%, while the rubber content of the under latex or heavier fraction was found to be 8.6 to 8.9%.

The following values for the mechanical stability were found:

Starting latex _____ 10′
Starting latex with stabilizer _____ 55′
Cream _____ 10′ to 11′

The treated latex was passed through the centrifuge for a period of 1 hour with a capacity of 150 kg. latex per hour. During this period there was no observable clogging or obstruction of the bowl.

This example shows that the treated latex of the present invention can be centrifuged under conditions of adjustment which cannot be employed with an untreated latex, and that the latex thus obtained has a rubber content and stabiltiy which are substantially higher than those obtainable using an untreated latex.

While several of the more advantageous embodiments of the new process have been described, it is evident that various modifications can be made in the specific procedures which have been set out without departing from the purview of this invention. It is possible to realize the benefits of this invention with any of the so-called high speed types of centrifuges which are capable of use in the usual procedure of centrifuging latex. The adjustment of the centrifuge can be altered to increase the concentration of the latex cream somewhat above 65%.

but, of course, this can be done only at the expense of capacity and of shorter operating runs. In general it may be said that, the higher the stability of the treated latex, the more concentrated the resulting cream which can be obtained. The cost of the stabilizing agent and the contamination of the latex caused thereby are two of the factors which produce an upper limit to the concentrations which can be obtained in practical operation. While it has been stated that any peptizing or stabilizing agent can be used which is capable of producing a stability of 15 minutes, it is obvious, of course, that in practical operations the only agents of this type which are useful are those capable of producing this required stability when added to the latex in relatively small proportions, such as 1 per cent or less. Other modifications of this invention which fall within the scope of the following claim will be immediately evident to those skilled in the art.

What is claimed is:

The process of concentrating latex which comprises adding to a normal latex to be concentrated a small amount of an alkali metal soap and the acid sulphuric ester of octodecyl-lactate, the quantity added being sufficient to produce a stability of at least about 15 minutes, as determined by the Hamilton Beach stirrer test with a stirrer operating at 10,000 revolutions per minute, then passing the so-stabilized latex through a centrifuge adjusted to produce a highly concentrated latex, whereby, without clogging the centrifuge, a more concentrated cream is obtained having a higher mechanical stability than that which could be produced with the same adjustment of the centrifuge in the absence of said soap and oleyl ester.

GODFRIED JOHAN van der BIE.